United States Patent
Tongue et al.

(10) Patent No.: US 11,052,328 B2
(45) Date of Patent: Jul. 6, 2021

(54) FUEL STABILIZATION SYSTEMS

(71) Applicants: Stephen E. Tongue, Hampden, MA (US); Jonathan Rheaume, West Hartford, CT (US); Haralambos Cordatos, Colchester, CT (US)

(72) Inventors: Stephen E. Tongue, Hampden, MA (US); Jonathan Rheaume, West Hartford, CT (US); Haralambos Cordatos, Colchester, CT (US)

(73) Assignee: Delavan Inc., West Des Moines, IA (US)

( * ) Notice: Subject to any disclaimer, the term of this patent is extended or adjusted under 35 U.S.C. 154(b) by 678 days.

(21) Appl. No.: 15/334,005

(22) Filed: Oct. 25, 2016

(65) Prior Publication Data

US 2018/0111063 A1    Apr. 26, 2018

(51) Int. Cl.
| | |
|---|---|
| *B01D 19/00* | (2006.01) |
| *C10G 31/06* | (2006.01) |
| *F02C 7/224* | (2006.01) |
| *F02C 7/232* | (2006.01) |

(52) U.S. Cl.
CPC ......... *B01D 19/0073* (2013.01); *C10G 31/06* (2013.01); *C10G 2300/202* (2013.01); *F02C 7/224* (2013.01); *F02C 7/232* (2013.01)

(58) Field of Classification Search
None
See application file for complete search history.

(56) References Cited

U.S. PATENT DOCUMENTS

| | | | | |
|---|---|---|---|---|
| 4,498,525 | A * | 2/1985 | Smith | F02C 7/14 123/552 |
| 6,415,595 | B1 * | 7/2002 | Wilmot, Jr. | B64D 13/006 60/266 |
| 6,709,492 | B1 | 3/2004 | Spadaccini et al. | |
| 2006/0196811 | A1 * | 9/2006 | Eppig | B01D 19/0078 208/131 |
| 2006/0263277 | A1 | 11/2006 | Tillman et al. | |
| 2009/0152172 | A1 * | 6/2009 | Huang | B08B 9/027 208/48 AA |
| 2011/0319698 | A1 | 12/2011 | Sohn et al. | |

(Continued)

FOREIGN PATENT DOCUMENTS

| | | |
|---|---|---|
| EP | 1920810 A2 | 5/2008 |
| GB | 862214 A | 3/1961 |

OTHER PUBLICATIONS

Extended European Search Report, of the European Patent Office, dated Mar. 21, 2018, issued in corresponding European Patent Application No. 17198186.3.

*Primary Examiner* — Christopher P Jones
*Assistant Examiner* — Phillip Y Shao
(74) *Attorney, Agent, or Firm* — Locke Lord LLP; Scott D. Wofsy; Georgi Korobanov

(57) ABSTRACT

A fuel stabilization system for removing oxygen from fuel includes an accumulator disposed along a fuel line, the accumulator includes a fuel inlet and a fuel outlet and a heat source disposed in thermal communication with the fuel in or upstream of the fuel inlet of the accumulator to increase the temperature of the fuel within the accumulator. The accumulator is configured to allow oxygen deposits to form therein as a result of the temperature increase of the fuel.

17 Claims, 2 Drawing Sheets

(56) References Cited

U.S. PATENT DOCUMENTS

2015/0314229 A1* 11/2015 Johnson ............. B01D 19/0026
  422/187
2015/0375868 A1* 12/2015 Smith .................. F02M 31/125
  165/292

* cited by examiner

FUEL STABILIZATION SYSTEMS

BACKGROUND

1. Field

The present disclosure relates to fuel systems, more specifically to fuel stabilization systems and methods.

2. Description of Related Art

Fuel supplies aboard commercial and military aircraft face an ever-increasing desire to be used as a thermal storage capacity. Transferring heat to fuel helps provide thermal control for valves, pumps, electronics, and gearboxes, among other ancillary hardware. As more heat is transferred to the fuel, temperatures rise, and dissolved oxygen combined with this high temperature result in fuel varnish/coke coating internal surfaces of fuel line components and nozzles, causing degraded performance and limited life. Certain systems remove oxygen through inert gas sparging, removal of oxygen through selective membranes, or using fuel additives to inhibit the chemical reaction and slow deposit growth. All such methods have historically shown unwieldly size, increased maintenance costs, or complex hardware solutions.

Such conventional methods and systems have generally been considered satisfactory for their intended purpose. However, there is still a need in the art for improved fuel stabilization systems and methods. The present disclosure provides a solution for this need.

SUMMARY

A fuel stabilization system for removing dissolved oxygen from fuel includes an accumulator disposed along a fuel line. The accumulator includes a fuel inlet and a fuel outlet and a heat source disposed in thermal communication with the fuel in or upstream of the fuel inlet of the accumulator to increase the temperature of the fuel within the accumulator. The accumulator is configured to allow carbonaceous deposits to form therein as a result of the temperature increase of the fuel.

The heat source can include a heater (e.g., a resistive heater or any other suitable powered heater). In certain embodiments, the heat source can include an engine system (e.g., a hot coolant/refrigerant circulated near the fuel line).

The system can include a regenerative heat exchanger disposed in the fuel line such that it is both upstream and downstream of the accumulator such that the fuel upstream of the accumulator passes through the regenerative heat exchanger to receive heat from fuel downstream of the accumulator. In certain embodiments, the heat source can be disposed downstream of a heating side of the regenerative heat exchanger. A cooling side of the regenerative heat exchanger can be downstream of and in fluid communication with the fuel outlet of the accumulator.

In certain embodiments, the system can be disposed immediately downstream of a fuel tank. In certain embodiments, the system can be disposed immediately upstream of a branch leading to an actuator which drives a fuel metering valve. Any other suitable location is contemplated herein. For example, one or more fuel pumps, actuators, and/or fuel valves can be disposed downstream of the system. The accumulator can be removable from the system to allow replacement and/or refurbishment thereof (e.g., when coke/varnish buildup begins to degrade fuel flow performance).

A method for removing oxygen from fuel can include applying heat to fuel upstream of an accumulator to raise the temperature of the fuel to cause deposits to form on the accumulator. Applying heat can include using a heater. Applying heat can include routing heat from an engine system.

The method can include reducing the temperature of the fuel downstream of the accumulator. Applying heat to the fuel upstream of the accumulator can include extracting heat from the fuel downstream of the accumulator (e.g., by passing the fuel through a regenerative heat exchanger). The method can include removing the accumulator to clean or replace the accumulator after deposit buildup.

In certain embodiments, the method can include monitoring a temperature of the fuel upstream of and/or within and/or downstream of the accumulator, wherein applying heat includes applying heat as a function of the temperature of the fuel. The method can include monitoring a deposit buildup rate within the accumulator, wherein applying heat includes applying heat as a function of the deposit buildup rate.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
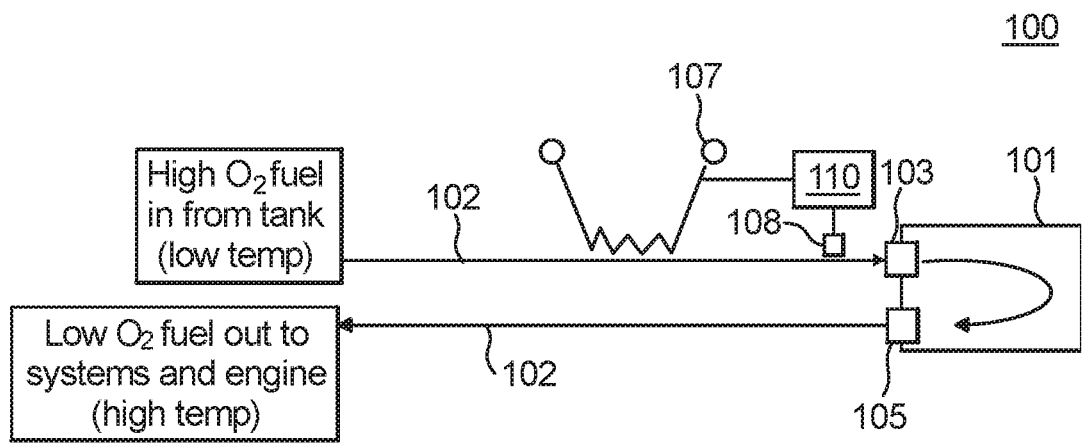
FIG. 1 is a schematic diagram of an embodiment of a system in accordance with this disclosure.
Figure 2:
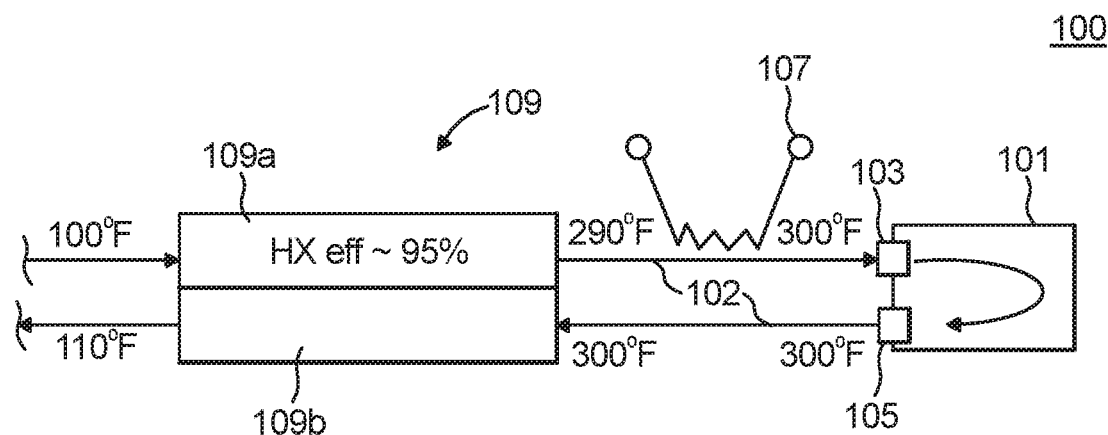
FIG. 2 is a schematic diagram of an embodiment of the system of FIG. 1 in accordance with this disclosure.
Figure 3:
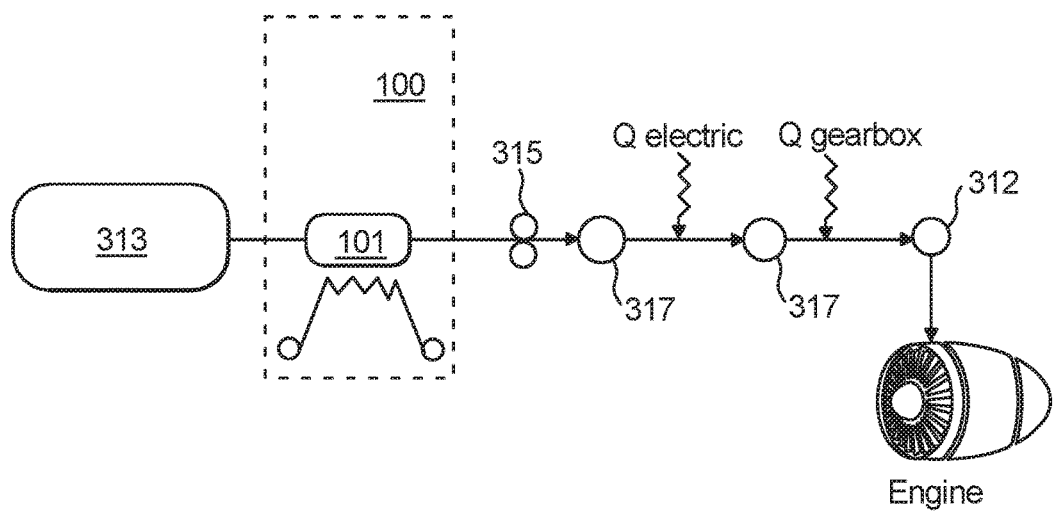
FIG. 3 is a schematic diagram of an embodiment of a fuel system of an aircraft in accordance with this disclosure.
Figure 4:
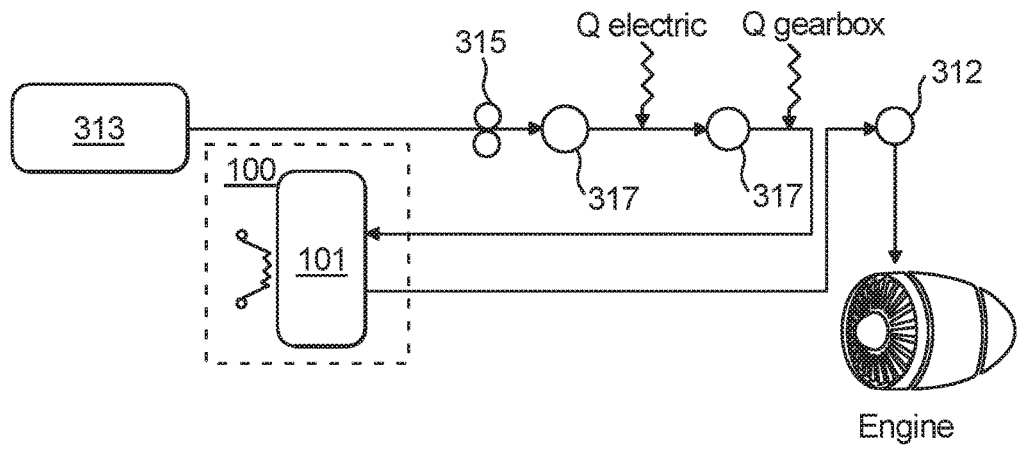
FIG. 4 is a schematic diagram of an embodiment of a fuel system of an aircraft in accordance with this disclosure.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. Other embodiments and/or aspects of this disclosure are shown in FIGS. 2-4. The systems and methods described herein can be used to prevent/reduce heat induced deposits forming on fuel system components which can prolong the life of the components.

Referring to FIG. 1, a fuel stabilization system 100 for removing oxygen from fuel includes an accumulator 101 disposed along a fuel line 102. The accumulator 101 includes a fuel inlet 103 and a fuel outlet 105. A heat source 107 is disposed in thermal communication with the fuel in or upstream of the fuel inlet 103 of the accumulator 101 to increase the temperature of the fuel within the accumulator 101.

The accumulator 101 is configured to allow oxygen deposits (e.g., varnish/coke) to form therein as a result of the temperature increase of the fuel. For example, the accumulator 101 can have a large surface area and be sufficiently dimensioned to promote deposits to form. In certain embodiments, the accumulator 101 can be dimensioned based on a predetermined temperature (e.g., 300F, 800F) of heated fuel entering the accumulator 101 to allow for sufficient dwell time in the accumulator 101 for the fuel to deoxygenate completely or near completely at the predetermined temperature. For example, in certain embodiments, temperature can be increased to reduce the size of the accumulator since less dwell time may be needed for a hotter fluid. Any suitable dimensions for the accumulator 101 are contemplated herein.

The accumulator 101 can include any suitable materials, coatings, or catalysts to promote the varnishing internally, for example, as is appreciated by those skilled in the art. For example, the accumulator 101 can include foam, mesh, flat plates, serpentine flow path, or the like disposed on internal surfaces thereof.

The accumulator 101 can be removable from the system 100 to allow replacement and/or refurbishment thereof (e.g., when coke/varnish buildup begins to degrade fuel flow performance). In certain embodiments, deposit buildup over time may be managed by in-situ burn-off, chemical treatment, replacement at regular intervals, and/or any suitable combination thereof. A filter may be utilized at an outlet of the accumulator 101 to prevent any solids from leaving the accumulator 101, for example.

The heat source 107 can include a heater (e.g., a resistive heater as shown or any other suitable powered heater). In certain embodiments, the heat source 107 can include an engine system (e.g., a hot coolant/refrigerant circulated near the fuel line 102). Any other suitable heat source 107 is contemplated herein.

In certain embodiments, the system 100 can include at least one temperature sensor 108 disposed in thermal communication with the fuel and/or the accumulator 101 to sense a temperature of the fuel (e.g., flowing into the accumulator after heating from the heat source 107). In certain embodiments, the system 100 can include a controller 110 that can control the heat source 107 based on temperature readings from the temperature sensor 108, for example. Referring to FIG. 2, the system 100 can further include a regenerative heat exchanger 109 disposed in the fuel line 102 such that it is both upstream and downstream of the accumulator 101. The fuel upstream of the accumulator 101 passes through a heating side 109a of the regenerative heat exchanger 109 to receive heat from fuel downstream of the accumulator 101, which passes through a cooling side 109b of the regenerative heat exchanger 109.

In certain embodiments, the heat source 107 can be disposed downstream of the heating side 109a of the regenerative heat exchanger 109. The cooling side 109b of the regenerative heat exchanger 109 can be downstream of and in fluid communication with the fuel outlet 105 of the accumulator 101. In certain embodiments, any other suitable components can be disposed between the regenerative heat exchanger 109 and the accumulator 101.

Referring to FIG. 3, in certain embodiments, embodiments of a system 100 can be disposed immediately downstream of a fuel tank 313 and upstream of all other fuel system components (e.g., a fuel nozzle 312). For example, one or more of a fuel pump 315 and/or a fuel valve 317 can be disposed downstream of the system 100. Any other suitable location is contemplated herein. For example, referring to FIG. 4, embodiments of a system 100 can be disposed downstream of one or more valves 317, pump 315, and downstream of heat addition from engine sources, but upstream of the fuel nozzle 312. Further, any suitable number of loops through the accumulator 101, and/or any suitable number of independent accumulators 101 is contemplated herein.

However, in certain embodiments, an accumulator 101 can be disposed at a branch in the fuel line leading to various actuators as appreciated by those having ordinary skill in the art. More specifically, for example, an accumulator 101 can be disposed upstream of the actuator which drives the fuel metering valve. There, the flow rate is very low, which can allow for the accumulator to be of smaller size and lower weight. At the same time, many systems experience deposits in these portions of the fuel system.

In accordance with at least one aspect of this disclosure, a method for removing oxygen from fuel can include applying heat to fuel upstream of an accumulator 101 to raise the temperature of the fuel to cause deposits to form on the accumulator 101. Applying heat can include using a heater. Applying heat can include routing heat from an engine system.

The method can include reducing the temperature of the fuel downstream of the accumulator 101. Applying heat to the fuel upstream of the accumulator 101 can include extracting heat from the fuel downstream of the accumulator 101 (e.g., by passing the fuel through a regenerative heat exchanger 109). The method can include removing the accumulator 101 to clean or replace the accumulator 101 after deposit buildup.

In certain embodiments, the method can include monitoring a temperature of the fuel upstream of and/or within and/or downstream of the accumulator 101. In such embodiments, applying heat can include applying heat as a function of the temperature of the fuel. The method can include monitoring a deposit buildup rate within the accumulator 101 in any suitable manner (e.g. with electromagnetic sensors, via flow rate sensors). In such embodiments, applying heat may include applying heat as a function of the deposit buildup rate.

Embodiments as described above prevent/reduce temperature based fuel deposits (e.g., from oxygen) from building up on critical system components. Generally, the fuel temperature is raised in a strategic location to accumulate the byproducts of the reactions with dissolved oxygen at elevated temperature in a known location, serving as a varnish accumulator. The fuel would then re-enter the normal flow channel, with oxygen depleted and any varnish risk gone for the remainder of the system and the more critical components. This varnish accumulator could be periodically flushed or replaced to ensure long term operation.

As described above, certain embodiments include an accumulator 101 that has a large surface area and a sufficient dwell time for most or all of the oxygen in the fuel to be consumed making varnish. The temperature could be raised to any specified level and controlled via a temperature sensor to ensure that the fuel was sufficiently de-oxygenated before being returned to the line.

Embodiments as described above can employ a regenerative heat exchanger 109 to minimize input heat needed from the heat source. Fuel enters the system, is heated on a heating side of a regenerative heat exchanger 109 to a temperature that promotes varnish formation and oxygen consumption, for example. The regenerative heat exchanger 109 can be very efficient, minimizing heat input, and providing the maximum fuel temperature differential for thermal control downstream. The fuel can then be heated further to a desired temperature with the heat source (e.g., which could be powered heating, oil, higher temperature fuel, bleed air, or other suitable source). The fuel can then flow through the accumulator 101 where varnish is intentionally plated out on the internal surfaces. Fuel can then exits the system being cooled by the regenerative heat exchanger 109 transferring its heat to the inlet stream.

Using a highly efficient regenerative heat exchanger, the fuel can be returned to the stream at nearly the same temperature it entered the system 100, as shown in FIG. 2, for example, with a 95% efficiency. In such a case, the heater only supplies 10 degrees F. of a 200 degree F. rise, for example.

The methods and systems of the present disclosure, as described above and shown in the drawings, provide for fuel stabilization systems with superior properties. While the apparatus and methods of the subject disclosure have been shown and described with reference to embodiments, those skilled in the art will readily appreciate that changes and/or modifications may be made thereto without departing from the spirit and scope of the subject disclosure.

What is claimed is:

1. A fuel stabilization system for removing dissolved oxygen from fuel, comprising:
    an accumulator disposed along a fuel line, the accumulator includes a fuel inlet and a fuel outlet; and
    a heat source disposed in thermal communication with the fuel in or upstream of the fuel inlet of the accumulator to increase the temperature of the fuel within the accumulator, wherein the accumulator is configured to allow carbonaceous deposits to form therein as a result of the temperature increase of the fuel.

2. The system of claim 1, wherein the heat source includes a heater.

3. The system of claim 1, wherein the heat source includes an engine system.

4. The system of claim 1, further comprising a regenerative heat exchanger disposed in the fuel line such that it is both upstream and downstream of the accumulator such that the fuel upstream of the accumulator passes through the regenerative heat exchanger to receive heat from fuel downstream of the accumulator.

5. The system of claim 4, wherein the heat source is disposed downstream of a heating side of the regenerative heat exchanger.

6. The system of claim 5, wherein a cooling side of the regenerative heat exchanger is downstream of and in fluid communication with the fuel outlet of the accumulator.

7. The system of claim 1, wherein the system is disposed immediately upstream of a branch leading to an actuator which drives a fuel metering valve.

8. The system of claim 1, wherein one or more of a fuel pump and/or a fuel valve is disposed downstream of the system.

9. The system of claim 1, wherein the accumulator is removable from the system to allow replacement and/or refurbishment thereof.

10. A method for removing oxygen from fuel, comprising:
    applying heat to fuel upstream of an accumulator to raise the temperature of the fuel to cause deposits to form on the accumulator.

11. The method of claim 10, wherein applying heat comprising using a heater.

12. The method of claim 10, wherein applying heat comprises routing heat from an engine system.

13. The method of claim 10, further comprising reducing the temperature of the fuel downstream of the accumulator.

14. The method of claim 13, wherein applying heat to the fuel upstream of the accumulator includes extracting heat from the fuel downstream of the accumulator.

15. The method of claim 10, further comprising removing the accumulator to clean or replace the accumulator after deposit buildup.

16. The method of claim 10, further comprising monitoring a temperature of the fuel upstream of and/or within and/or downstream of the accumulator, wherein applying heat includes applying heat as a function of the temperature of the fuel.

17. The method of claim 16, further comprising monitoring a deposit buildup rate within the accumulator, wherein applying heat includes applying heat as a function of the deposit buildup rate.

* * * * *